United States Patent
Fukawatase et al.

(10) Patent No.: US 8,752,861 B2
(45) Date of Patent: Jun. 17, 2014

(54) VEHICLE REAR SIDE AIRBAG DEVICE FIXING STRUCTURE

(75) Inventors: Osamu Fukawatase, Miyoshi (JP); Takehisa Shamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/821,680

(22) PCT Filed: Sep. 14, 2010

(86) PCT No.: PCT/JP2010/065868
§ 371 (c)(1),
(2), (4) Date: Mar. 8, 2013

(87) PCT Pub. No.: WO2012/035619
PCT Pub. Date: Mar. 22, 2012

(65) Prior Publication Data
US 2013/0175792 A1    Jul. 11, 2013

(51) Int. Cl.
*B60R 21/16*    (2006.01)
*B60R 21/207*    (2006.01)

(52) U.S. Cl.
USPC ............ 280/728.2; 280/730.2; 297/354.1; 297/361.1

(58) Field of Classification Search
USPC .............. 280/728.2, 730.2; 297/250.1, 353, 297/354.1, 361.1; 224/275
See application file for complete search history.

(56) References Cited

U.S. PATENT DOCUMENTS

| 5,564,735 | A | | 10/1996 | Boy et al. | |
|---|---|---|---|---|---|
| 5,601,332 | A | * | 2/1997 | Schultz et al. | 297/216.13 |
| 5,947,630 | A | * | 9/1999 | Dillon | 403/393 |
| 6,030,046 | A | * | 2/2000 | Dorow | 297/464 |
| 6,082,818 | A | * | 7/2000 | Muller | 297/250.1 |
| 6,126,192 | A | * | 10/2000 | Enders | 280/728.2 |
| 6,276,754 | B1 | * | 8/2001 | Youssef-Agha et al. | 297/253 |
| 6,279,798 | B1 | * | 8/2001 | Partch et al. | 224/275 |
| 6,634,710 | B1 | * | 10/2003 | Adamson et al. | 297/253 |
| 6,767,057 | B2 | * | 7/2004 | Neelis | 297/253 |
| 6,783,151 | B2 | * | 8/2004 | Rasch et al. | 280/729 |
| 7,296,854 | B2 | * | 11/2007 | Lentz | 297/353 |

(Continued)

FOREIGN PATENT DOCUMENTS

| JP | A-8-40176 | 2/1996 |
|---|---|---|
| JP | A-11-91486 | 4/1999 |

(Continued)

*Primary Examiner* — Ruth Ilan
*Assistant Examiner* — Darlene P Condra
(74) *Attorney, Agent, or Firm* — Oliff PLC

(57) ABSTRACT

A fixing structure of a rear side airbag device for a vehicle may assure a margin of time for the side airbag to be deployed. In a vehicle rear side airbag device fixing structure, an airbag module is fixed by fastening to a child seat fixing member conforming to ISOFix standards, via a metal plate. The child seat fixing member is fixed to the rear floor of a vehicle body at the downward side of a rear seatback. Therefore, in comparison with a structure in which an airbag module is fixed to a rear wheel housing via a bracket, the airbag module may be disposed to the vehicle width direction inner side. Moreover, the child seat fixing member exhibits a high rigidity with respect to a side collision of the vehicle. Therefore, fixing portions of the airbag module are resistant to being deformed during a side collision of the vehicle.

13 Claims, 7 Drawing Sheets

(56) References Cited

U.S. PATENT DOCUMENTS

| | | |
|---|---|---|
| 7,393,005 B2 * | 7/2008 | Inazu et al. ............... 280/730.2 |
| 7,510,227 B2 * | 3/2009 | Mahaffy ....................... 296/64 |
| 7,798,519 B2 * | 9/2010 | Kawabe et al. ............ 280/728.3 |
| 2002/0011505 A1 * | 1/2002 | Cole et al. ..................... 224/275 |
| 2005/0121886 A1 | 6/2005 | Bossenmaier et al. |
| 2005/0269846 A1 * | 12/2005 | Vits et al. .................. 297/216.1 |
| 2006/0163850 A1 | 7/2006 | Inazu et al. |
| 2009/0039623 A1 | 2/2009 | Kawabe et al. |

FOREIGN PATENT DOCUMENTS

| | | |
|---|---|---|
| JP | A-2000-190805 | 7/2000 |
| JP | A-2000-343994 | 12/2000 |
| JP | A-2002-36997 | 2/2002 |
| JP | A-2002-211288 | 7/2002 |
| JP | A-2005-88774 | 4/2005 |
| JP | A-2005-519799 | 7/2005 |
| JP | A-2006-205765 | 8/2006 |
| JP | A-2009-40328 | 2/2009 |
| JP | A-2009-113594 | 5/2009 |

* cited by examiner

VEHICLE REAR SIDE AIRBAG DEVICE FIXING STRUCTURE

TECHNICAL FIELD

The present invention relates to a fixing structure for fixing a rear side airbag device for a vehicle to the vehicle body side.

BACKGROUND ART

In a side airbag device for a rear seat disclosed in the following Patent Document 1, a module case structuring an airbag module is fixed to an inner panel of a rear wheel housing via a mounting bracket.
Patent Document 1: JP-A No. 2009-113594

DISCLOSURE OF INVENTION

Technical Problem

With the rear seat side airbag device as described above, when there is a side collision of the vehicle (particularly when there is a side collision with a pole), a mounting portion (fixing portion) of the airbag module may be deformed by the impact and there may be a change in attitude of the airbag module. Therefore, the side airbag must be deployed before the attitude of the airbag module changes. However, if the airbag module is fixed at the rear wheel housing as described above, the fixing portion is likely to deform in an initial period of the collision. Therefore, there is only a small margin of time for the side airbag to be deployed.

In consideration of the situation described above, an object of the present invention is to provide a fixing structure of a rear side airbag device for a vehicle that may assure a margin of time for the side airbag to be deployed in.

Solution to Problem

A vehicle rear side airbag device fixing structure according to a first aspect of the invention includes: a child seat fixing member having an elongated, shape that is disposed at a downward side of a rear seatback of a rear seat of a vehicle, the length direction of the child seat fixing member being in a vehicle width direction, the child seat fixing member being fixed to a vehicle body or a seat frame, and the child seat fixing member being provided with a fixing portion for child seat fixing; and a vehicle rear side airbag device including an airbag module that is fixed to the child seat fixing member directly or via a rigid member that is a separate body from the seat frame, a side airbag that is provided in the airbag module being inflated and deployed to sideward of an occupant sitting on the rear seat in the event of a side collision of the vehicle.

In the vehicle rear side airbag device fixing structure according to the first aspect, the airbag module is fixed to the elongated, child seat fixing member directly or via the rigid member (a member made of metal or the like). This child seat fixing member is disposed at the downward side of the rear seatback, which is close to the pelvis area of an occupant, and is fixed to the vehicle body or seat frame. Therefore, in comparison with a structure in which an airbag module is fixed to a rear wheel housing via a bracket, the airbag module may be disposed to a side closer to the occupant (the vehicle width direction inner side). In addition, because this child seat fixing member exhibits a high rigidness with respect to a side collision of the vehicle, the fixing portion of the airbag module is resistant to being deformed when there is a side collision of the vehicle. Therefore, the attitude of the airbag module does not change in the event of a side collision, or a duration from when a side collision occurs until the attitude of the airbag module changes may be assured of being long. Consequently, a margin of time for the side airbag to be deployed may be assured.

In a vehicle rear side airbag device fixing structure according to a second aspect of the invention, in the vehicle rear side airbag device fixing structure according to the first aspect, the rear seatback includes a main body portion that is tillable about a lower end portion thereof relative to the vehicle body, and a side seat portion that is disposed at a vehicle width direction outer side relative to the main body portion and is fixed to the vehicle body, and the airbag module is disposed in the side seat portion.

In the vehicle rear side airbag device fixing structure according to the second aspect, the rear seatback is a collapsible-type seatback in which a main body portion is tiltable about a lower end portion thereof relative to the vehicle body. The side seat portion of the rear seatback is disposed at the vehicle width direction outer side relative to the main body portion of the rear seatback, and the airbag module is disposed inside this side seat portion. Because the side seat portion is fixed to the vehicle body side, the airbag module is not displaced relative to the vehicle body when the main body portion of the rear seatback is tilted relative to the vehicle body. Thus, because the airbag module may be maintained in a static state (a fixed state) relative to the vehicle body, damage to the airbag module, a wire harness connected thereto or the like may be prevented.

In a vehicle rear side airbag device fixing structure according to a third aspect of the invention, in the vehicle rear side airbag device fixing structure according to the first aspect or the second aspect, a lower end portion of the airbag module is fixed to the child seat fixing member directly or via the rigid member.

In the vehicle rear side airbag device fixing structure according to the third aspect, the lower end portion of the airbag module is fixed to the child seat fixing member directly or via the rigid member. Therefore, a support rigidness of the lower end portion of the airbag module that is disposed close to the pelvis area of an occupant may be excellently assured. Consequently, a reaction force when a lower portion side of the side airbag is inflating and deploying to sideward of the pelvis area of the occupant may be excellently supported.

In a vehicle rear side airbag device fixing structure according to a fourth aspect of the invention, in the vehicle rear side airbag device fixing structure according to the third aspect, the side seat portion includes a seat frame made of resin, the airbag module includes an inflator that inflates and deploys the side airbag by producing gas inside the side airbag, and the airbag module is fixed by being fastened to the seat frame in a height region at which the inflator is disposed.

In the vehicle rear side airbag device fixing structure according to the fourth aspect, the airbag module is fixed by being fastened to the seat frame made of resin that is provided at the side seat portion, at the height range in which the inflator is disposed. Therefore, a reaction force from the side airbag being inflated and deployed by gas produced by the inflator may be excellently supported by the seat frame made of resin.

In a vehicle rear side airbag device fixing structure according to a fifth aspect of the invention, in the vehicle rear side airbag device fixing structure according to the fourth aspect, the rigid member is superposed with the seat frame, the airbag module is fixed by being fastened both to the rigid member and to the seat frame, and a lower end side of the rigid member is fixed to the child seat fixing member.

In the vehicle rear side airbag device fixing structure according to the fifth aspect, the airbag module is fixed both to the rigid member (a metal plate or the like) superposed with the seat frame made of resin and to the seat frame. Thus, the seat frame made of resin may be reinforced by the rigid member. Moreover, because the lower end side of the rigid member is fixed to the child seat fixing member, a support rigidness of the airbag module that is fixed by fastening to the rigid member and the seat frame made of resin may be improved.

In a vehicle rear side airbag device fixing structure according to a sixth aspect of the invention, in the vehicle rear side airbag device fixing structure according to any one of the first to fifth aspects, the airbag module is fixed to the child seat fixing member via the rigid member, the vehicle rear side airbag device includes a webbing, of which one end side is joined to the rigid member and another end side is sewn to a seam portion of a cover of the rear seatback, and an opening for allowing the side airbag to inflate and deploy can be formed in the rear seatback by the seam portion being ruptured by inflation pressure of the side airbag acting on the seam portion via the webbing.

In the vehicle rear side airbag device fixing structure according to the sixth aspect, the one end side of the webbing that transfers the inflation pressure of the side airbag to the seam portion of the cover of the rear seatback is joined to the rigid member fixed to the child seat fixing member. Therefore, the inflation pressure of the side airbag acting on the webbing may be excellently supported by the rigid member.

In a vehicle rear side airbag device fixing structure according to a seventh aspect of the invention, in the vehicle rear side airbag device fixing structure according to the sixth aspect, the one end side of the webbing is anchored at an anchoring fixture that is fixed by fastening both to the rigid member and to the airbag module.

In the vehicle rear side airbag device fixing structure according to the seventh aspect, the anchoring fixture at which the one end side of the webbing is anchored is fixed by fastening both to the rigid member and to the airbag module. Therefore, a rigidness of this fastening-fixing portion may be improved.

In a vehicle rear side airbag device fixing structure according to an eighth aspect of the invention, in the vehicle rear side airbag device fixing structure according to any one of the first to seventh aspects, a projection portion of the rigid member is projected to the downward side from the airbag module side, the projection portion is fixed to the child seat fixing member, and the projection portion is formed in an open cross-section shape of which one side in a vehicle front-and-rear direction is open.

In the vehicle rear side airbag device fixing structure according to the eighth aspect, the projection portion of the rigid member fixed to the child seat fixing member, which is projected to the downward side from the airbag module side, is formed with an open cross-section shape of which one side in the vehicle front-and-rear direction is open. Therefore, the weight of the rigid member may be reduced while the rigidness of the projection portion (the rigid member) with respect to a load in the vehicle front-and-rear direction is assured.

In a vehicle rear side airbag device fixing structure according to a ninth aspect of the invention, in the vehicle rear side airbag device fixing structure according to any one of the first to eighth aspects, the child seat fixing member is formed of a pipe member, and the rigid member is fixed by fastening to a fastening fixture that is fixed to the pipe member.

In the vehicle rear side airbag device fixing structure according to the ninth aspect, because the fastening fixture for fixing by fastening the rigid member is attached at the pipe member that constitutes the child seat fixing member, fixing by fastening of the rigid member to the child seat fixing member may be made easier.

Advantageous Effects of Invention

As described above, in the vehicle rear seat airbag device fixing structure according to the first aspect of the invention, a margin of time for the side airbag to be deployed in may be assured.

In the vehicle rear seat airbag device fixing structure according to the second aspect of the invention, damage to the airbag module, a wire harness connected thereto or the like may be prevented.

In the vehicle rear seat airbag device fixing structure according to the third aspect of the invention, a reaction force when the lower portion side of the side airbag inflates and deploys to sideward of the pelvis area of an occupant may be excellently supported.

In the vehicle rear seat airbag device fixing structure according to the fourth aspect of the invention, a reaction force from the side airbag may be excellently supported by the seat frame made of resin.

In the vehicle rear seat airbag device fixing structure according to the fifth aspect of the invention, support rigidness of the airbag module may be improved.

In the vehicle rear seat airbag device fixing structure according to the sixth aspect of the invention, the inflation pressure of the side airbag acting on the webbing may be excellently supported by the rigid member.

In the vehicle rear seat airbag device fixing structure according to the seventh aspect of the invention, rigidness of the fastening-fixing portion between the airbag module and the rigid member may be improved.

In the vehicle rear seat airbag device fixing structure according to the eighth aspect of the invention, the weight of the rigid member may be reduced while assuring the rigidness of the rigid member with respect to a load in the vehicle front-and-rear direction In the vehicle rear seat airbag device fixing structure according to the ninth aspect of the invention, fixing by fastening of the rigid member to the child seat fixing member may be made easier.

BEST MODE FOR CARRYING OUT THE INVENTION

Figure 1:
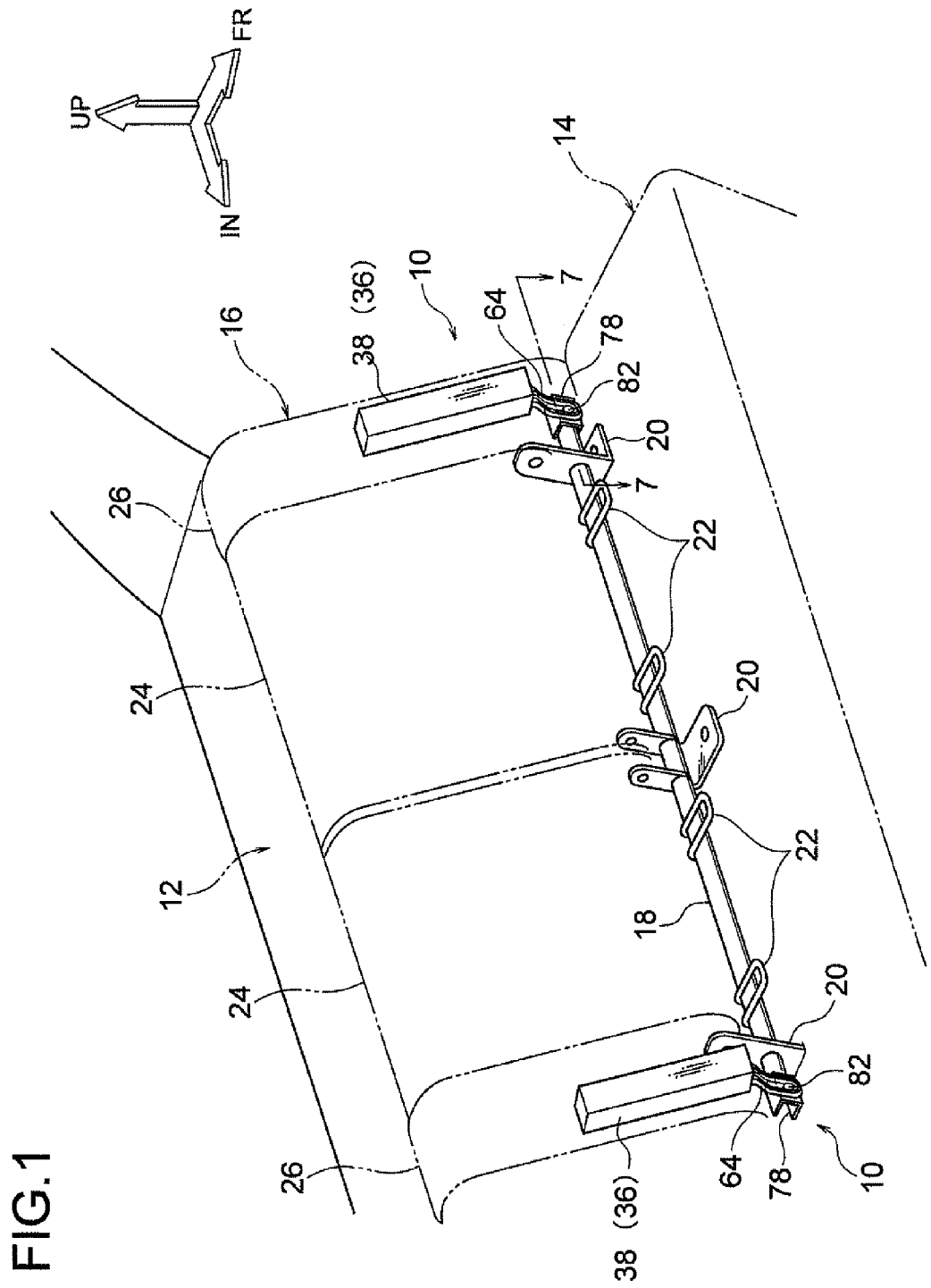
FIG. 1 is a perspective diagram of a rear seat with a constitution in which a vehicle rear side airbag device fixing structure in accordance with an exemplary embodiment of the present invention is employed.

Herebelow, a vehicle rear side airbag device fixing structure 10 according to an exemplary embodiment of the present invention is described in association with FIG. 1 to FIG. 7. Herein, the arrow UP in the drawings represents a vehicle upward direction, the arrow FR in the drawings represents a vehicle forward direction, and the arrow IN in the drawings represents a vehicle width inner side direction.

Figure 2:
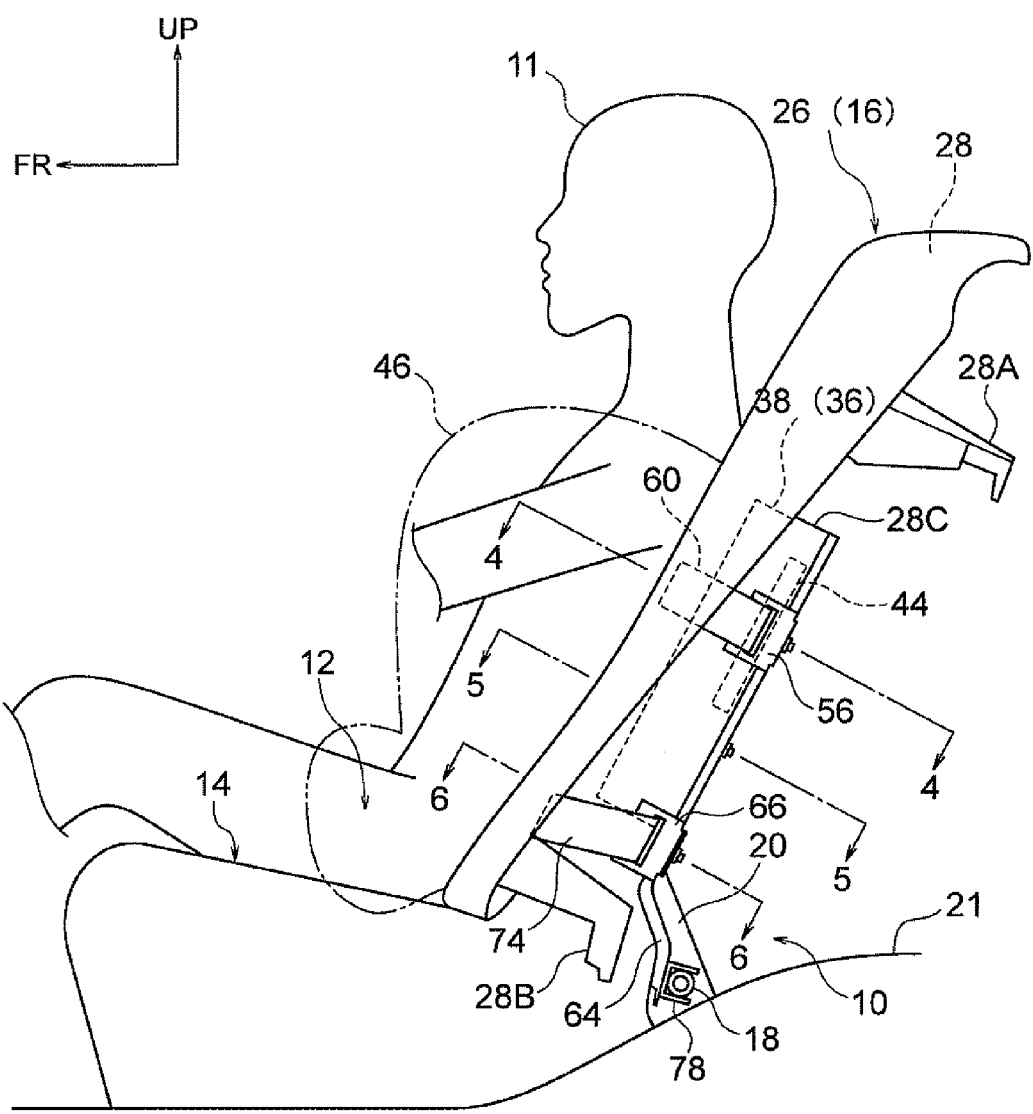
FIG. 2 is a side diagram of the rear seat shown in FIG. 1.

As shown in FIG. 1 and FIG. 2, a rear seat 12 at which the vehicle rear side airbag device fixing structure 10 according to the present exemplary embodiment is employed is provided with a rear seat cushion 14 that supports the buttock area and thigh area of an occupant 11 and a rear seatback 16 that supports the pelvis area and back area of the occupant 11. Depending on the type of vehicle, a headrest is provided at an upper end portion of the rear seatback 16.

A child seat fixing member 18 is provided at the lower side of a lower end portion of the rear seatback 16. The child seat fixing member 18 conforms to the ISOFix standards (standards on sizes and attachment methods of fixing devices which have been unified by the International Organisation of Standardisation). The child seat fixing member 18 is formed of a high-strength pipe member, and is disposed in a state in which a length direction thereof runs along the vehicle width direction. Mounting brackets 20 are fixed by welding or the like at each of two length direction end portions and a length direction middle portion of the child seat fixing member 18. The mounting brackets 20 are fixed by fastening with nuts and bolts to a rear floor 21 of the vehicle body (see FIG. 2).

As shown in FIG. 1, strikers 22, which serve as fixing portions for compliance with the ISOFix standards, are attached in advance, by welding or the like, at predetermined positions in the length direction of the child seat fixing member 18 (sets of two locations between neighboring mounting brackets 20). The strikers 22 are formed in substantial "U" shapes of which opening portions open toward the vehicle rearward side in plan view. The strikers 22 are engaged with long, narrow fixing devices that are provided at lower end portions of child seats, which are not shown in the drawings. Thus, when an inertial force toward the vehicle body forward side acts on a child seat, the child seat fixing member 18 supports the load toward the vehicle forward side and blocks movement of the child seat to the vehicle forward side.

The aforementioned rear seatback 16 is a rear seatback of a divided collapsible type, including a pair of left and right main body portions 24 and a pair of left and right side seat portions 26. The main body portions 24 are tillable relative to the rear floor 21, and the side seat portions 26 are disposed at vehicle width direction outer sides (vehicle door sides) relative to the main body portions 24.

The pair of left and right main body portions 24 are each provided with a seat frame made of metal, which is not shown in the drawings. Lower end portions of these frames are joined, to be turnable about an axis along the vehicle width direction, to upper end portions of the mounting brackets 20. Thus, the rear seatback 16 is tiltable to the rear seat cushion 14 side thereof. At usual times, the main body portions 24 are detachably joined to vehicle body side structural members by locking mechanisms (not shown in the drawings) provided at the rear side of each of two side portions of the main body portions 24.

Figure 3:
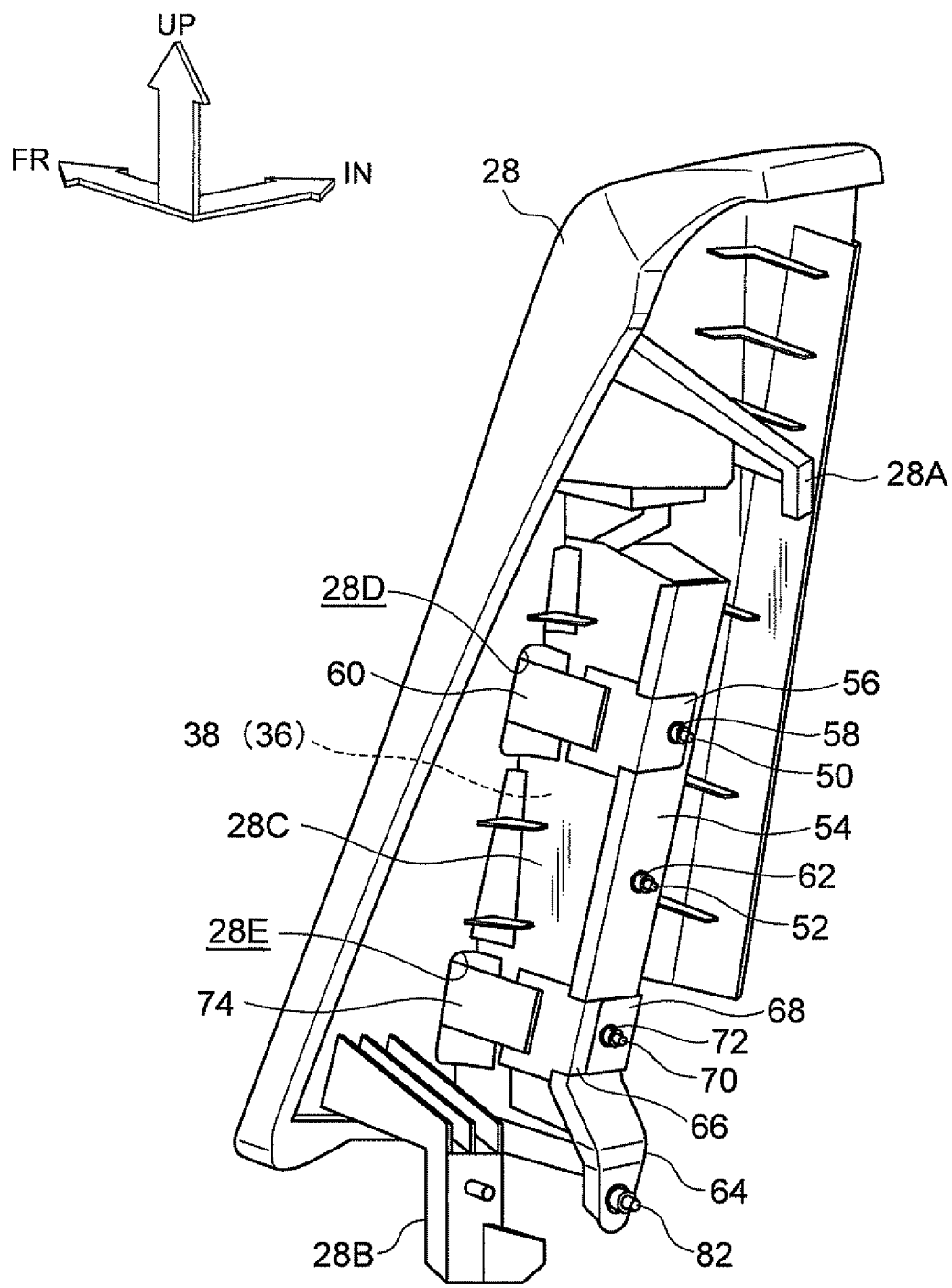
FIG. 3 is a perspective diagram of a seat frame constituting a side seat portion of a rear seatback shown in FIG. 1.
Figure 4:
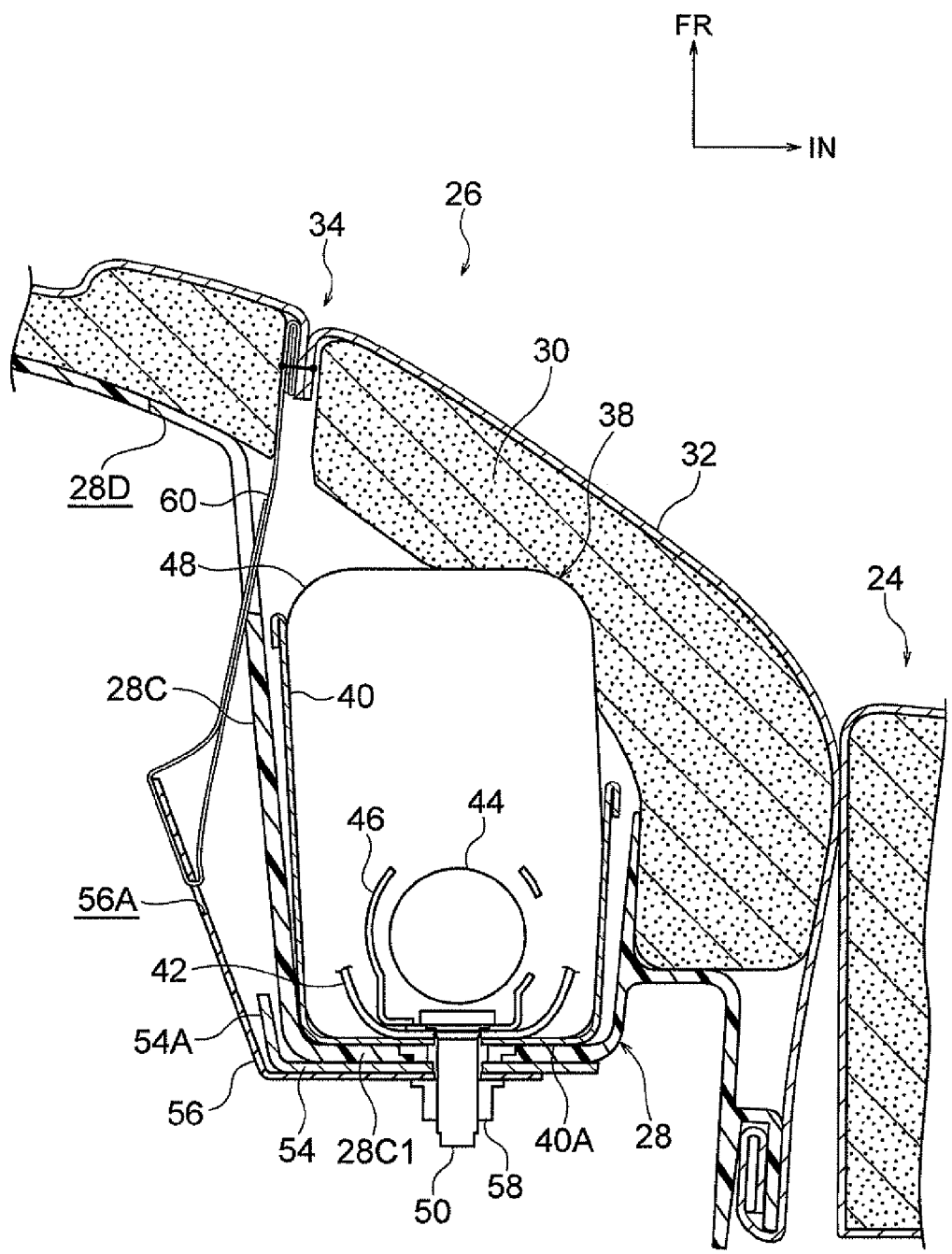
FIG. 4 is a magnified sectional diagram showing a sectional plane cut along line 4-4 in FIG. 2.
Figure 5:
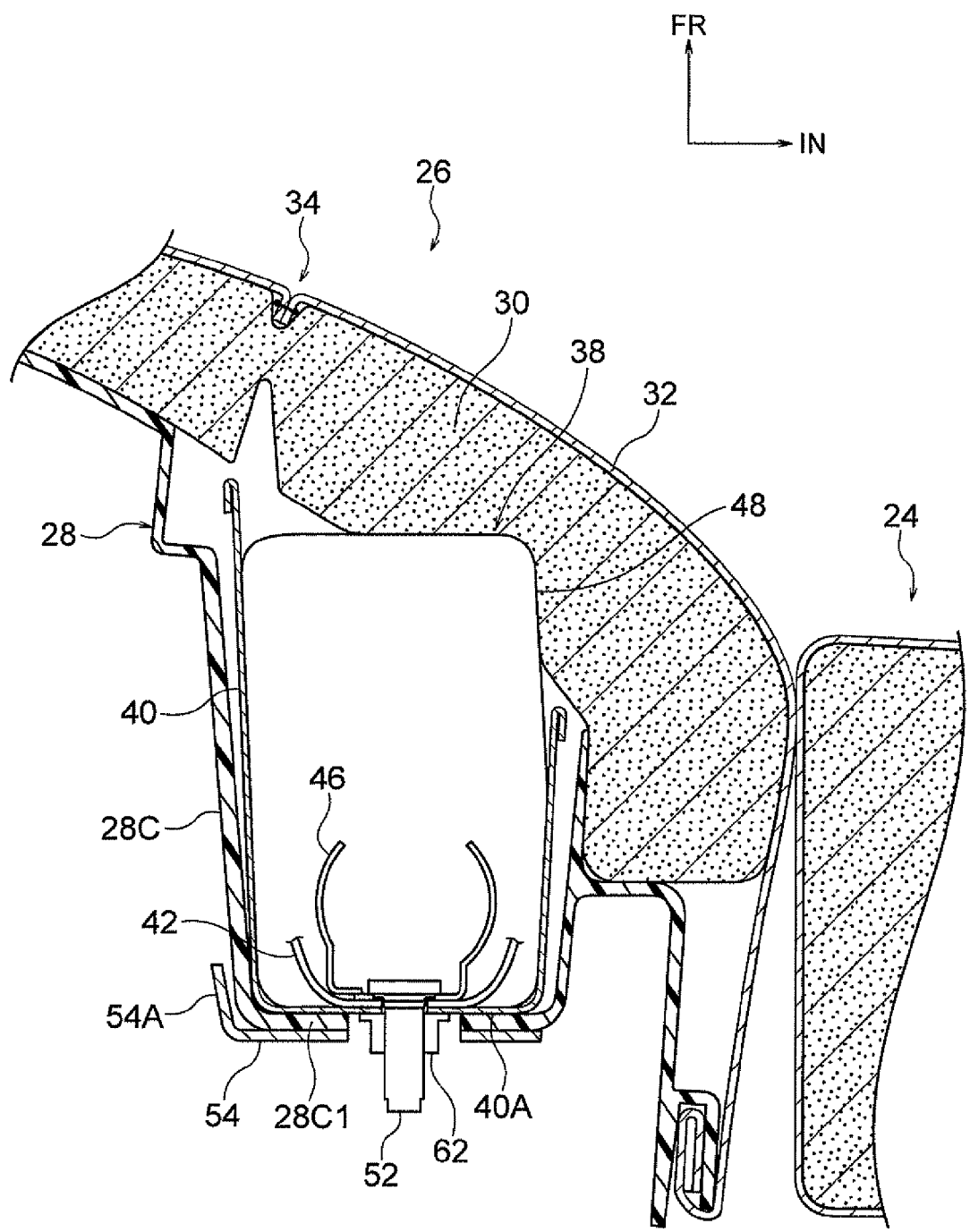
FIG. 5 is a magnified sectional diagram showing a sectional plane cut along line 5-5 in FIG. 2.
Figure 6:
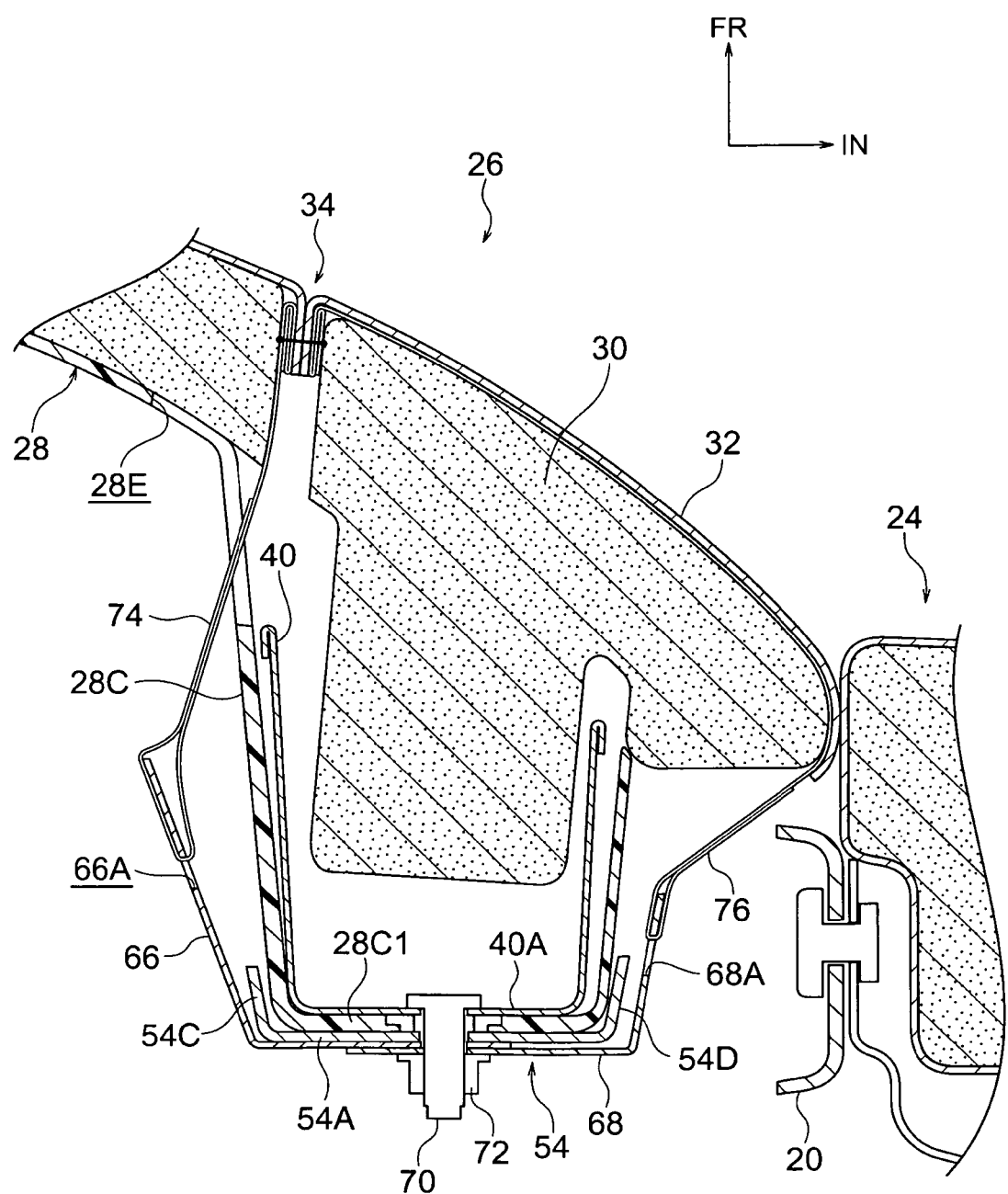
FIG. 6 is a magnified sectional diagram showing a sectional plane cut along line 6-6 in FIG. 2.

The pair of left and right side seat portions 26 are each provided with a seat frame 28 made of resin (see FIG. 3). A hook portion 28A provided at an upper portion side of each seat frame 28 is hooked on a vehicle body side structural member, and a fastening portion 2813 provided at the lower end side of the seat frame 28 is fixed by fastening to a vehicle body side structural member. Thus, the seat frame 28 is fixed to the vehicle body. As shown in FIG. 4 to FIG. 6, a pad 30 formed of a foam body of urethane foam or the like is mounted at the vehicle forward side of the seat frame 28, and a surface of the pad 30 is covered with a cover 32. A seam portion 34 extending in the up-and-down direction is provided at the cover 32.

An airbag module mounting portion 28C is provided at the above-described seat frame 28. The airbag module mounting portion 28C is formed in a substantially box-like shape, of which the vehicle forward side is open. An airbag module 38 that constitutes principal portions of a vehicle rear side airbag device 36 is mounted at the airbag module mounting portion 28C.

As shown in FIG. 4 to FIG. 6, the airbag module 38 is provided with a module case 40, a side airbag 42 (only a portion of which is shown in FIG. 4 to FIG. 6), a cylindrical inflator 44, and a diffuser 46. The module case 40 is fitted into the airbag module mounting portion 28C. The side airbag 42 is stowed in the module case 40 in a folded state. The inflator 44 is a gas generator that produces gas in the side airbag 42 when there is a side collision. The diffuser 46 is a flow regulator that encloses the inflator 44. For convenience of description, hatching is not shown in the cross-sections of some members in FIG. 4 to FIG. 6.

The module case 40 is formed in a substantial box-like shape that is vertically long, of which the vehicle forward side is open. A bottom wall portion 40A of the module case 40 is disposed in a state of abutting against a bottom wall 28C1 of the airbag module mounting portion 28C.

The side airbag 42 is folded up by a predetermined folding method (bellows folding in the present exemplary embodiment), and a shape thereof is maintained by being covered with a wrapping material 48. The wrapping material 48 ruptures easily at a time of inflation and deployment of the side airbag 42. Common folding methods of an airbag are roll folding and bellows folding. In the present exemplary embodiment, the airbag is folded up by bellows folding, which is easy to unfold. However, the airbag may be folded by roll folding, and may be folded by a combination of roll folding and bellows folding.

The inflator 44 and the diffuser 46 are disposed inside the folded side airbag 42. As shown in FIG. 2, the inflator 44 is disposed with a length direction thereof along the up-and-down direction of the side seat portion 26, and plural gas emission holes are formed in one length direction end portion of the inflator 44 (in this case, the lower end portion). A squib, which is an ignition device, and an ignition agent are disposed in the other length direction end portion of the inflator 44 (in this case, the upper end portion). The squib is electrically connected to an airbag electronic control unit (ECU) that is disposed at the lower side of a console box or the like, and the airbag ECU is electrically connected to a side collision sensor disposed at a side portion of the vehicle body. When the side collision sensor detects a side collision condition of the vehicle, the side collision sensor outputs a detection signal to the airbag ECU. The airbag ECU makes a determination as to whether or not to activate the side airbag 42, and if a determination to activate the side airbag is made, a predetermined electric current is passed through the squib and the ignition agent is ignited. As a result, gas is emitted from the plural gas emission holes provided in the inflator 44. An inflator of a high-pressure gas enclosing type may be used instead of the inflator 44 of a gas-producing agent enclosing type.

As shown in FIG. 4, the above-described inflator 44 is covered by the diffuser 46, and is fixed to the diffuser 46 at locations which are not shown in the drawings. The diffuser 46 regulates flows of gas emitted from the inflator 44, and supplies the gas to the interior of the side airbag 42.

A pair of upper and lower stud bolts 50 and 52 (see FIG. 4 and FIG. 5) are provided at the diffuser 46. The upper side stud bolt 50 penetrates through the side airbag 42, the bottom wall portion 40A of the module case 40 and the bottom wall portion 28C1 of the airbag module mounting portion 28C. The stud bolt 50 also penetrates through a metal plate 54 (a rigid member) superposed with a rear face of the bottom wall 28C1 and an anchoring fixture 56 superposed with a rear face of the metal plate 54. A distal end side of the stud bolt 50 is threaded into a nut 58. Thus, the upper portion side of the diffuser 46 is fixed by fastening to the module case 40, the metal plate 54 and the anchoring fixture 56, and to the seat frame 28. The side airbag 42 is sandwiched between the diffuser 46 and the bottom wall portion 40A of the module case 40. The airbag module 38 is fixed by fastening to the seat frame 28 at a height range in which the inflator 44 is disposed.

As shown in FIG. 2, the above-mentioned metal plate 54 is formed in a long, narrow shape along the up-and-down direction of the side seat portion 26. The metal plate 54 includes a frame reinforcement portion 54A and a bracket portion 54B (a projection portion). The frame reinforcement portion 54A has a linear shape in side view, substantially the whole of which, apart from a lower end portion thereof, is superposed with the bottom wall 28C1 of the airbag module mounting portion 28C. The bracket portion 54B is projected to the downward side of the frame reinforcement portion 54A. An upper portion side and an up-and-down direction middle portion of the frame reinforcement portion 54A are formed in "L" shapes in cross-section, being provided with a flanged portion 54C that is projected to the vehicle forward side from a vehicle width direction outer side end portion of the frame reinforcement portion 54A. The flanged portion 54C improves bending rigidity of the frame reinforcement portion 54A (the metal plate 54), and the airbag module mounting portion 28C is reinforced by the frame reinforcement portion 54A.

The aforementioned anchoring fixture 56 is formed by a process of bending a plate made of metal into an "L" shape. A proximal end side of the anchoring fixture 56 is superposed with the frame reinforcement portion 54A and is fixed by fastening to the seat frame 28. A distal end side of the anchoring fixture 56 is projected to the vehicle forward side from the vehicle width direction outer side of the airbag module mounting portion 28C. An insertion hole 56A, through which one end side of an upper side webbing 60 is inserted, is formed at the distal end side of the anchoring fixture 56. The upper side webbing 60 is formed in a belt shape. The upper side webbing 60 is formed of a fabric that is more resistant to stretching than the cover 32. Portions of the upper side webbing 60 preceding and succeeding the insertion through the insertion hole 56A are superposed and sewn together. Thus, the one end side of the upper side webbing 60 is anchored at the anchoring fixture 56 and, via the anchoring fixture 56, is joined to (anchored at) the frame reinforcement portion 54A and the seat frame 28. The other end side of the upper side webbing 60 is inserted through an aperture 28D formed in the seat frame 28, and is sewn to the seam portion 34 provided at the cover 32. Therefore, when the side airbag 42 is inflating and deploying, the upper side webbing 60 is stretched by inflation pressure of the side airbag 42. Thus, the other end side of the upper side webbing 60 concentrates the inflation pressure of the side airbag 42 on the region of the seam portion 34 to which the other end side of the upper side webbing 60 is sewn, and the seam portion 34 is ruptured starting from this region.

As shown in FIG. 5, the lower side stud bolt 52 provided at the diffuser 46 penetrates through the side airbag 42 and the bottom wall portion 40A of the module case 40, and a distal end side of the stud bolt 52 is threaded into a nut 62. Thus, the lower portion side of the diffuser 46 is fixed by fastening to the module case 40, and the side airbag 42 is sandwiched between the diffuser 46 and the bottom wall portion 40A of the module case 40. Penetration holes with larger diameters than the nut 62 are formed in the bottom wall 28C1 of the airbag module mounting portion 28C and the frame reinforcement portion 54A. Thus, the nut 62 and the stud bolt 52 are disposed in a state of not being in contact with the bottom wall 28C1 and the frame reinforcement portion 54A.

As shown in FIG. 6, at the lower end portion side of the airbag module mounting portion 28C, a nut 72 is threaded onto a distal end side of a bolt 70. The bolt 70 penetrates through the bottom wall portion 40A of the module case 40, the bottom wall 28C1 of the airbag module mounting portion 28C, the frame reinforcement portion 54A, and anchoring fixtures 66 and 68. Thus, the module case 40 is fixed by fastening to the upper end portion of the frame reinforcement portion 54A and the anchoring fixtures 66 and 68, and to the seat frame 28. The lower portion side of the frame reinforcement portion 54A is formed in an open cross-section shape (a substantial "U" shape in cross section) of which the vehicle forward side is open. The lower portion side of the frame reinforcement portion 54A is provided with a flanged portion 54D that is projected to the vehicle forward side from the vehicle width direction inner side of the frame reinforcement portion 54A. Rigidness of the frame reinforcement portion 54A with respect to loads in the vehicle front-and-rear direction is improved by the flanged portion 54D and the flanged portion 54C.

The above-mentioned anchoring fixtures 66 and 68 are formed by processes of bending plates made of metal into "L" shapes. A proximal end side of the anchoring fixture 66 is superposed with the frame reinforcement portion 54A. In a state in which a proximal end side of the anchoring fixture 68 is superposed with the proximal end side of the anchoring fixture 66, the proximal end sides of the anchoring fixtures 66 and 68 are fixed by fastening to the frame reinforcement portion 54A and the seat frame 28.

The distal end side of the anchoring fixture 66 is projected to the vehicle forward side from the vehicle width direction outer side of the airbag module mounting portion 28C, and the distal end side of the anchoring fixture 68 is projected to the vehicle forward side from the vehicle width direction inner side of the airbag module mounting portion 28C. Insertion holes 66A and 68A are formed in the distal end sides of the anchoring fixtures 66 and 68. One end sides of lower side webbings 74 and 76, which are formed in belt shapes, are inserted through the insertion holes 66A and 68A. The lower side webbings 74 and 76 are formed of the fabric that is more resistant to stretching than the cover 32. Portions of the lower side webbings 74 and 76 preceding and succeeding the insertions through the insertion holes 66A and 68A are superposed and sewn together. Thus, the one end sides of the lower side webbings 74 and 76 are anchored at the anchoring fixtures 66 and 68 and, via the anchoring fixtures 66 and 68, are joined to (anchored at) the frame reinforcement portion 54A and the seat frame 28. The other end side of the anchoring fixture 66 is inserted through an aperture 28E formed in the seat frame 28, and is sewn to the seam portion 34 provided at the cover 32. The other end side of the anchoring fixture 68 is projected between the pad 30 and the cover 32 to the seam portion 34 side, and is sewn to the seam portion 34. Therefore, when the side airbag 42 is inflating and deploying, the lower side webbings 74 and 76 are stretched by inflation pressure of the side airbag 42. Thus, the other end sides of the lower side webbings 74 and 76 concentrate the inflation pressure of the side airbag 42 on the region of the seam portion 34 to which the other end sides of the lower side webbings 74 and 76 are sewn, and the seam portion 34 is ruptured starting from this region.

The above-mentioned bracket portion 54B is projected integrally from the lower end of the frame reinforcement portion 54A diagonally to the vehicle rearward side and downward side. Similarly to the lower portion side of the frame reinforcement portion 54A, the bracket portion 54B is formed in an open cross-section shape (a substantial "U" shape in cross section) of which the vehicle forward side is open, and rigidness of the bracket portion 54B with respect to loads in the vehicle front-and-rear direction is improved by the flanged portions 54C and 54D. A constitution is possible in which the bracket portion 54B and frame reinforcement portion 54A are formed as separate bodies and joined together by welding or the like.

Figure 7:
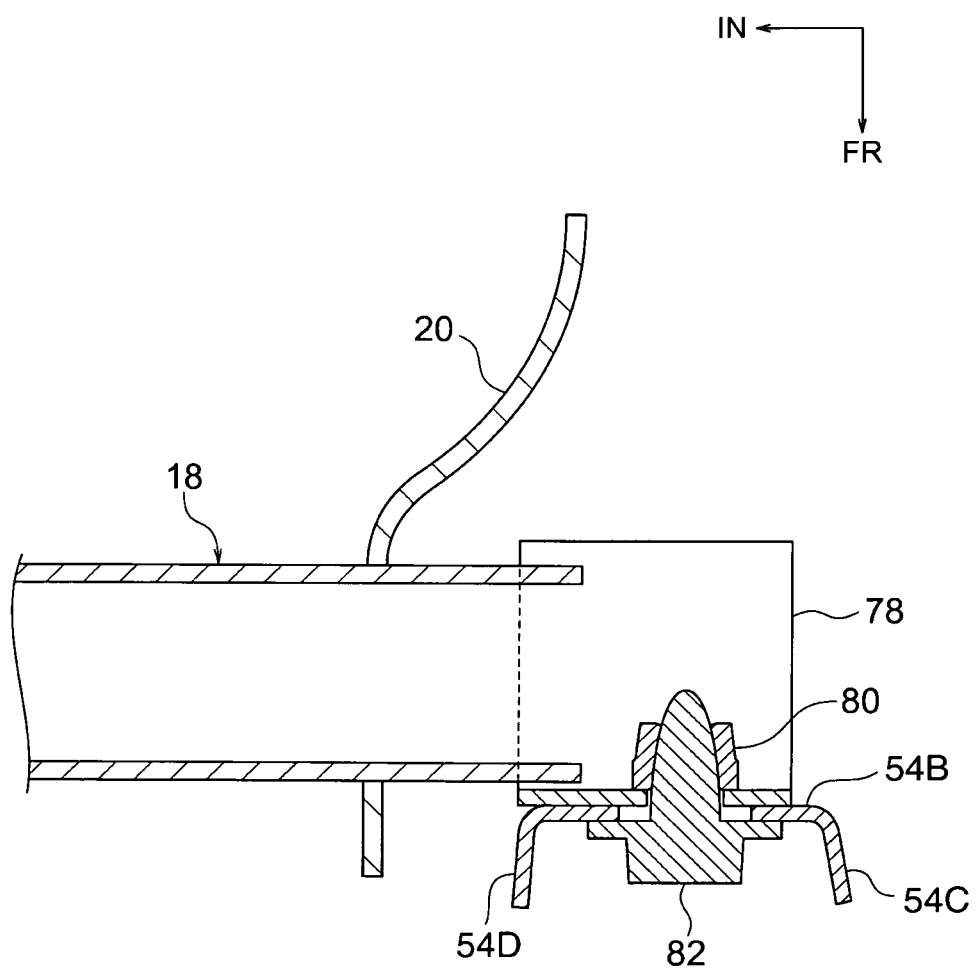
FIG. 7 is a magnified sectional diagram showing a sectional plane cut along line 7-7 in FIG. 1.

The lower portion side of the bracket portion 54B is inflected to the vehicle forward side relative to the upper portion side thereof. A lower end portion of the bracket portion 54B is disposed at the vehicle forward side relative to a length direction end portion (the vehicle width direction outer side end portion) of the child seat fixing member 18. A fastening fixture 78 formed in an open cross-section shape (a substantial "U" shape in cross-section), of which the vehicle rearward side is open, is attached by welding or the like to each of two length direction end portions of the pipe member structuring the child seat fixing member 18. As shown in FIG. 7, a welded nut 80 is attached to the fastening fixture 78, and the lower end portion of the bracket portion 54B is fixed by fastening to the fastening fixture 78, by a bolt 82 threaded onto the welded nut 80. Thus, the lower end portion of the airbag module 38 is fixed by fastening to the child seat fixing member 18 via the metal plate 54.

Next, operation and effects of the present exemplary embodiment are described. In the present exemplary embodiment, if the vehicle has a side collision, the side collision sensor outputs a detection signal to the airbag ECU, and the airbag ECU activates the inflator 44. When the inflator 44 activates, gas is produced inside the side airbag 42, and the side airbag 42 inflates. The inflation pressure of the side airbag 42 acts on the seam portion 34 of the cover 32 of the side seat portion 26, via the upper side webbing 60 and the lower side webbings 74 and 76, and the seam portion 34 ruptures. Thus, an opening is formed in the front face side of the side seat portion 26, and the side airbag 42 inflates and deploys through this opening to sideward of the occupant 11 (between the occupant 11 and a door, which is not shown in the drawings). Hence, the side airbag 42 protects the occupant 11 from an impact during the side collision.

In the present exemplary embodiment, the airbag module 38 is fixed by fastening, via the metal plate 54, to the child seat fixing member 18 conforming to the ISOFix standards. Because the child seat fixing member 18 is fixed to the rear floor 21 of the vehicle body at the downward side of the rear seatback 16 that is close to the pelvis area of the occupant 11, the airbag module 38 may be disposed to the occupant 11 side (vehicle width direction inner side) in comparison with a structure in which an airbag module is fixed to a rear wheel housing via a bracket. Moreover, because the child seat fixing member 18 exhibits a high rigidity with respect to a side collision of the vehicle, fixing portions of the airbag module 38 are resistant to being deformed during a side collision of the vehicle. Therefore, a long duration from when the side collision occurs until the attitude of the airbag module 38 changes may be assured, and consequently a margin of time for the side airbag 42 to be deployed in may be assured.

Furthermore, in the present exemplary embodiment, the rear seatback 16 includes the main body portions 24, which are tiltable relative to the vehicle body, and the side seat portions 26 that are disposed at the vehicle width direction outer sides relative to the main body portions 24, and the airbag module 38 is disposed inside each side seat portion 26. Because each side seat portion 26 is fixed to the vehicle body, when the main body portions 24 of the rear seatback 16 are tilted relative to the vehicle body, the airbag module 38 is not displaced relative to the vehicle body. Thus, the airbag module 38 may be retained in a static state (a fixed state) relative to the vehicle body. Therefore, damage to the airbag module 38, a wire harness connected thereto or the like may be prevented.

In the present exemplary embodiment, the lower end portion of the airbag module 38 is fixed by fastening to the child seat fixing member 18 via the metal plate 54. Thus, the support rigidity of the lower end portion of the airbag module 38 that is disposed close to the pelvis area of the occupant 11 may be excellently assured. Therefore, a reaction force when the lower portion side of the side airbag 42 is inflating and deploying to sideward of the pelvis area of the occupant 11 may be excellently supported.

In the present exemplary embodiment, the airbag module 38 is fixed by fastening to the seat frame 28 made of resin that is provided at the side seat portion 26 at a height range in which the inflator 44 is disposed. Thus, a reaction force from the side airbag 42 being inflated and deployed by the gas produced by the inflator 44 may be excellently supported by the seat frame 28 made of resin.

In the present exemplary embodiment, the airbag module 38 is fixed by fastening both to the frame reinforcement portion 54A of the metal plate 54 that is superposed with the seat frame 28 made of resin and to the seat frame 28. Thus, the seat frame 28 made of resin may be reinforced by the metal plate 54. Moreover, because the lower end portion of the bracket portion 54B provided at the metal plate 54 is fixed by fastening to the child seat fixing member 18, the seat frame 28 may be excellently supported, and therefore a support rigidness of the airbag module 38 that is fixed by fastening to the metal plate 54 and the seat frame 28 made of resin may be improved.

In the present exemplary embodiment, the one end sides of the upper side webbing 60 and the lower side webbings 74 and 76, which transfer the inflation pressure of the side airbag 42 to the seam portion 34 of the cover 32 of the side seat portion 26, are joined to the metal plate 54 that is fixed by fastening to the child seat fixing member 18. Therefore, the inflation pressure of the side airbag 42 acting on the upper side webbing 60 and the lower side webbings 74 and 76 may be excellently supported by the metal plate 54.

In the present exemplary embodiment, the anchoring fixtures 66 and 68 at which the one end sides of the lower side webbings 74 and 76 are anchored are fixed by fastening both to the metal plate 54 and to the airbag module 38, and the anchoring fixture 56 at which the one end side of the upper side webbing 60 is anchored is fixed by fastening both to the metal plate 54 and to the airbag module 38. Therefore, the rigidity of these fastening-fixing portions may be improved.

In the present exemplary embodiment, the bracket portion 54B that is projected to the downward side from the metal plate 54 and is fixed by fastening to the child seat fixing member 18 is formed in an open cross-section shape of which the vehicle forward side is open. Therefore, the metal plate 54 may be reduced in weight while the rigidness of the bracket portion 54B (and the metal plate 54) with respect to loads in the vehicle front-and-rear direction is assured.

In the present exemplary embodiment, the fastening fixture 78 for fastening-fixing the bracket portion 54B is attached to the pipe member structuring the child seat fixing member 18. Therefore, the metal plate 54 may be fixed by fastening to the child seat fixing member 18 easily.

The exemplary embodiment described above has a constitution in which the child seat fixing member 18 is equipped with the fastening fixture 78. However, the inventions according to claims 1 to 8 are not limited thus. A structure for fixing the metal plate 54 to the child seat fixing member 18 may be suitably modified.

The exemplary embodiment described above has a constitution in which a fastening portion of the metal plate 54 to the child seat fixing member 18 is disposed at the vehicle width direction outer side relative to the mounting brackets 20. However, this is not limiting and a constitution is possible in which a fastening portion is disposed at a vehicle width direction inner side relative to the mounting brackets 20.

The exemplary embodiment described above has a constitution in which the bracket portion 54B of the metal plate 54 is projected to the downward side from the airbag module 38 side. However, the invention is not limited thus. The position and shape of the bracket portion 54B may be suitably modified.

The exemplary embodiment described above has a constitution in which the anchoring fixtures 56, 66 and 68, at which the one end sides of the upper side webbing 60 and the lower side webbings 74 and 76 are anchored, are fixed by fastening both to the metal plate 54 and to the airbag module 38 and the like. However, the invention is not limited thus. A constitution is possible in which the anchoring fixtures 56, 66 and 68 are fixed by fastening to the airbag module 38 and the like separately from the metal plate 54.

The exemplary embodiment described above has a constitution in which the lower side webbings 74 and 76 and the upper side webbing 60 are provided. However, the invention is not limited thus. A constitution is possible in which these webbings are omitted.

The exemplary embodiment described above has a constitution in which the metal plate 54 is integrally provided with the frame reinforcement portion 54A and the bracket portion 54B. However, the invention is not limited thus. A constitution is possible in which the bracket portion 54B or the whole of the metal plate 54 is omitted, and the module case 40 of the airbag module 38 is extended to the downward side and fixed to the child seat fixing member 18. A constitution is also possible in which a portion of the metal plate 54 at the upward side relative to the portion of fastening-fixing to the airbag module 38 by the bolt 70 and nut 72 (the upper portion side and the up-and-down direction middle portion of the frame reinforcement portion 54A) is omitted from the metal plate 54. A further constitution is possible in which the frame reinforcement portion 54A and the bracket portion 54B are divided and separately fixed to the airbag module 38. Further, the airbag module 38 may be fixed to a metal plate (rigid member) that is welded to the child seat fixing member 18.

The exemplary embodiment described above has a constitution in which the metal plate 54 serves as the rigid member. However, the invention is not limited thus. A constitution is possible in which the rigid member is formed of a non-metal material that exhibits a high rigidity with respect to a side collision of the vehicle.

The exemplary embodiment described above has a constitution in which the airbag module 38 is fixed by fastening to the seat frame 28 at the height region in which the inflator 44 is disposed. However, the invention is not limited thus. The position of a fastening portion of the airbag module 38 to the seat frame 28 may be suitably modified.

The exemplary embodiment described above has a constitution in which the side seat portion 26 is provided with the seat frame 28 made of resin. However, the invention is not limited thus. A constitution is possible in which the seat frame of the side seat portion is made of metal.

The exemplary embodiment described above has a constitution in which the lower end portion of the airbag module 38 is fixed by fastening to the child seat fixing member 18 via the metal plate 54 (the rigid member). However, the invention is not limited thus. A constitution is possible in which a portion other than a lower end portion of an airbag module is fixed by fastening to the child seat fixing member via the rigid member. Moreover, a method of fixing the rigid member to the child seat fixing member is not limited to fixing by fastening and may be welding and the like.

The exemplary embodiment described above has a constitution in which the rear seatback 16 is collapsible and the airbag modules 38 are disposed in the side seat portions 26. However, the invention is not limited thus. The structure of the rear seat and the positions of airbag modules may be suitably modified.

The exemplary embodiment described above has a constitution in which the child seat fixing member 18 is fixed to the rear floor 21 of the vehicle body. However, the invention is not limited thus. A constitution is possible in which, if the rear seat is movable in the vehicle front-and-rear direction, the child seat fixing member is fixed to the seat frame of a rear seat cushion.

In other respects, the present invention may be embodied with various modifications in a technical scope not departing from the spirit of the invention. It will be clear that the scope of the present invention is not to be limited to the exemplary embodiment described above.

The invention claimed is:

1. A vehicle rear side airbag device fixing structure comprising:
    a child seat fixing member having an elongated shape that is disposed at a downward side of a rear seatback of a rear seat of a vehicle, a length direction of the child seat fixing member being in a vehicle width direction, the child seat fixing member being fixed to a vehicle body or a seat frame, and the child seat fixing member being provided with a fixing portion for child seat fixing; and
    a vehicle rear side airbag device including an airbag module having a lower end portion that is fixed to the child seat fixing member via a rigid member that is a separate body from the seat frame and that is superposed with the seat frame, a side airbag that is provided in the airbag module being inflated and deployed sideward of an occupant sitting on the rear seat in the event of a side collision of the vehicle, wherein
    a side of the rear seat includes a seat frame made of resin, the airbag module includes an inflator that inflates and deploys the side airbag by producing gas inside the side airbag, and the airbag module is fixed by being fastened both to the rigid member and to the seat frame in a height region at which the inflator is disposed, and
    a lower end side of the rigid member is fixed to the child seat fixing member.

2. The vehicle rear side airbag device fixing structure according to claim 1, wherein the rear seatback includes:
    a main body portion that is tiltable about a lower end portion thereof relative to the vehicle body; and a side seat portion that is disposed at a vehicle width direction outer side relative to the main body portion and is fixed to the vehicle body, and the airbag module is disposed in the side seat portion.

3. The vehicle rear side airbag device fixing structure according to claim 1, wherein:

the airbag module is fixed to the child seat fixing member via the rigid member;

the vehicle rear side airbag device includes a webbing, of which one end side is joined to the rigid member and another end side is sewn to a seam portion of a cover of the rear seatback; and an opening for allowing the side airbag to inflate and deploy is formed in the rear seatback by the seam portion being ruptured by inflation pressure of the side airbag acting on the seam portion via the webbing.

4. The vehicle rear side airbag device fixing structure according to claim 3, wherein the one end side of the webbing is anchored at an anchoring fixture that is fixed by being fastened both to the rigid member and to the airbag module.

5. The vehicle rear side airbag device fixing structure according to claim 1, wherein a projection portion of the rigid member is projected to the downward side from the airbag module side, the projection portion is fixed to the child seat fixing member, and the projection portion is formed in an open cross-section shape of which one side in a vehicle front-and-rear direction is open.

6. The vehicle rear side airbag device fixing structure according to claim 1, wherein the child seat fixing member is formed of a pipe member, and the rigid member is fixed by being fastened to a fastening fixture that is fixed to the pipe member.

7. The vehicle rear side airbag device fixing structure according to claim 1, wherein the rigid member is made of metal.

8. A vehicle rear side airbag device fixing structure comprising:

a child seat fixing member having an elongated shape that is disposed at a downward side of a rear seatback of a rear seat of a vehicle, a length direction of the child seat fixing member being in a vehicle width direction, the child seat fixing member being fixed to a vehicle body or a seat frame, and the child seat fixing member being provided with a fixing portion for child seat fixing; and a vehicle rear side airbag device including an airbag module that is fixed to the child seat fixing member via a rigid member that is a separate body from the seat frame, a side airbag that is provided in the airbag module being inflated and deployed sideward of an occupant sitting on the rear seat in the event of a side collision of the vehicle, wherein:

the vehicle rear side airbag device includes a webbing, of which one end side is joined to the rigid member and another end side is sewn to a seam portion of a cover of the rear seatback; and an opening for allowing the side airbag to inflate and deploy is formed in the rear seatback by the seam portion being ruptured by inflation pressure of the side airbag acting on the seam portion via the webbing.

9. The vehicle rear side airbag device fixing structure according to claim 8, wherein the rear seatback includes:

a main body portion that is tiltable about a lower end portion thereof relative to the vehicle body; and a side seat portion that is disposed at a vehicle width direction outer side relative to the main body portion and is fixed to the vehicle body, and the airbag module is disposed in the side seat portion.

10. The vehicle rear side airbag device fixing structure according to claim 8, wherein the one end side of the webbing is anchored at an anchoring fixture that is fixed by being fastened both to the rigid member and to the airbag module.

11. The vehicle rear side airbag device fixing structure according to claim 8, wherein a projection portion of the rigid member is projected to the downward side from the airbag module side, the projection portion is fixed to the child seat fixing member, and the projection portion is formed in an open cross-section shape of which one side in a vehicle front-and-rear direction is open.

12. The vehicle rear side airbag device fixing structure according to claim 8, wherein the child seat fixing member is formed of a pipe member, and the rigid member is fixed by being fastened to a fastening fixture that is fixed to the pipe member.

13. The vehicle rear side airbag device fixing structure according to claim 8, wherein the rigid member is made of metal.

* * * * *